United States Patent [19]

Nishino et al.

[11] Patent Number: 4,562,511
[45] Date of Patent: Dec. 31, 1985

[54] ELECTRIC DOUBLE LAYER CAPACITOR

[75] Inventors: Atsushi Nishino, Neyagawa; Akihiko Yoshida, Osaka; Ichiroh Tanahashi, Neyagawa, all of Japan

[73] Assignee: Matsushita Electric Industrial Co., Ltd., Kadoma, Japan

[21] Appl. No.: 584,608

[22] PCT Filed: Jun. 30, 1983

[86] PCT No.: PCT/JP83/00208
 § 371 Date: Feb. 28, 1984
 § 102(e) Date: Feb. 28, 1984

[87] PCT Pub. No.: WO84/00246
 PCT Pub. Date: Jan. 19, 1984

[30] Foreign Application Priority Data

Jun. 30, 1982 [JP] Japan ................. 57-114590
Sep. 14, 1982 [JP] Japan ................. 57-159849
Oct. 8, 1982 [JP] Japan ................. 57-177938
Jan. 28, 1983 [JP] Japan ................. 58-13456

[51] Int. Cl.$^4$ ............................ H01G 4/16; H01G 4/22
[52] U.S. Cl. ................................. 361/324; 361/315
[58] Field of Search ............... 361/301, 309, 311, 312, 361/314, 315, 323, 324

[56] References Cited

U.S. PATENT DOCUMENTS

| | | | |
|---|---|---|---|
| 1,891,080 | 12/1932 | Danziger | 361/324 X |
| 2,391,686 | 12/1945 | McLean | 361/324 X |
| 2,797,373 | 6/1957 | Peck | 361/323 X |
| 3,090,705 | 5/1963 | Miksits | 361/324 X |
| 3,419,770 | 12/1968 | Tomago et al. | 361/324 |
| 3,700,975 | 8/1973 | Butherus et al. | |

FOREIGN PATENT DOCUMENTS

| | | | |
|---|---|---|---|
| 553991 | 7/1932 | Fed. Rep. of Germany | 361/324 |
| 48-59363 | 8/1973 | Japan | |
| 55-99714 | 7/1980 | Japan | |
| 56-114312 | 9/1981 | Japan | |
| 57-17136 | 1/1982 | Japan | |
| 57-12515 | 1/1982 | Japan | |
| 28940 | 6/1982 | Japan | 361/309 |

Primary Examiner—Donald A. Griffin
Attorney, Agent, or Firm—Cushman, Darby & Cushman

[57] ABSTRACT

This invention relates to electric double layer capacitor utilizing electric double layer formed at interface between polarizable electrode and electrolyte, and carbon fibers or activated carbon fibers are used as polarizable electrode (17), and on the polarizable electrodes (17) consisting of the carbon fibers or activated carbon fibers conductive electrodes (18) as collectors are formed to constitute electrode parts.

22 Claims, 39 Drawing Figures

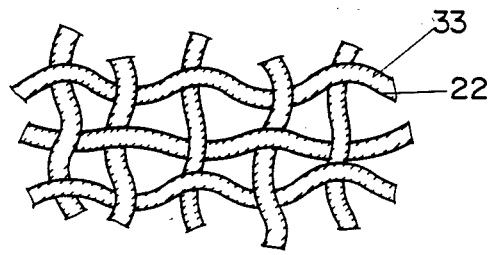
FIG. 19 (A)
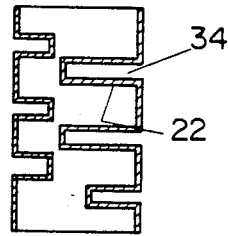
FIG. 19 (B)
FIG. 20
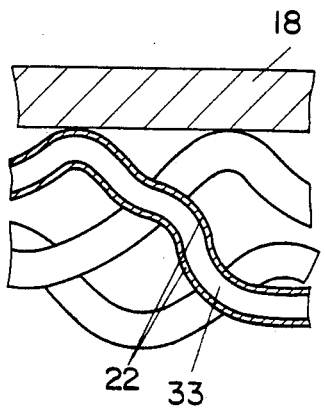

FIG. 31 (A)
FIG. 31 (B)
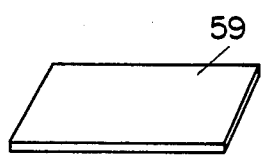
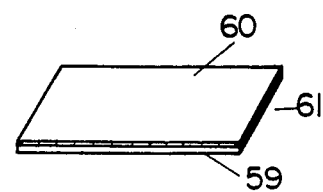
FIG. 31 (C)
FIG. 31 (D)
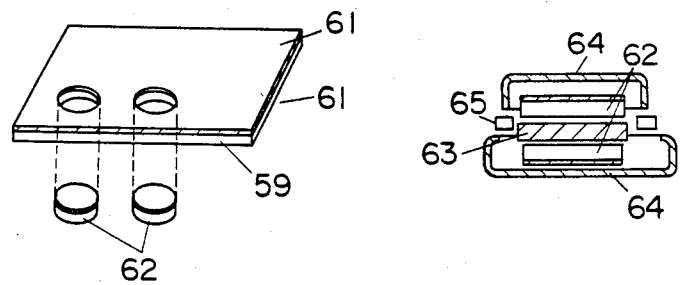
FIG. 32
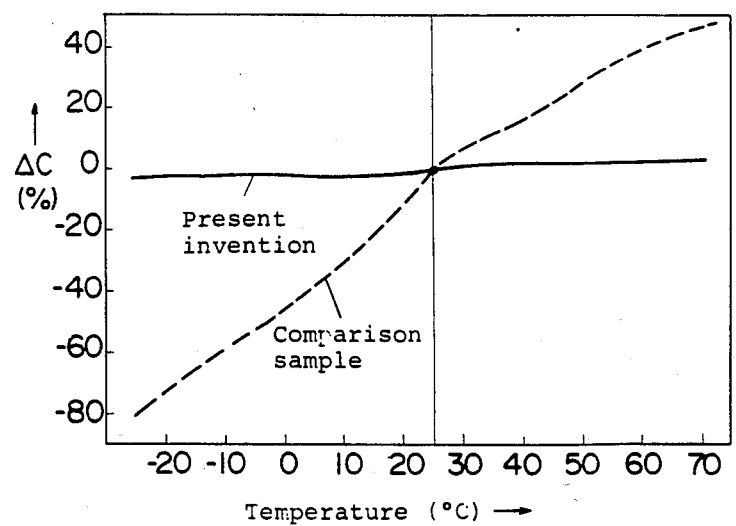

ELECTRIC DOUBLE LAYER CAPACITOR

FIELD OF THE TECHNOLOGY

This invention relates to an electric double layer capacitor using activated carbon as polarizable electrode.

BACKGROUND TECHNOLOGY

The electrolytic double layer capacitor is constituted by constituting a polarizable electrode unit by an activated charcoal layer 1 and a collector electrode 2 for that layer, and by putting a separator 3 soaked with an electrolyte between a pair of polarizable electrodes.

Hitherto, as the constitution examples of electrolytic double layer capacitors of this kind, there have been the following two kinds. That is, the first one that is, as shown in FIG. 1, expanded metal or punching metal worked from aluminum sheet is used as collector body, a paste containing activated charcoal powder as main component and a binder of fluorine resin or the like as a polarizable electrode 5 is coated to be held on a surface of the collectors 4 by rolling rollers 7, and a pair of the collectors 4 and the polarizable electrode 5 with a separator 8 inbetween are wound up and electrolyte is injected thereto. FIG. 4 is a sectional structure of the electric double layer capacitor of this system, FIG. 5 is an enlarged view of a part of FIG. 4. 9, 10 are electrode leads, 11 is an outside face, 12 is a rubber sealing cap.

The second one has a structure as shown in FIG. 6, that is, conductive elastomer 13, insulative ring 14, separator 15 and a viscous mixture 16 of activated charcoal powder and an electrolyte are combined as shown in the drawing, and has a disk type outside view as shown in FIG. 7.

Both of these conventional designs use powder type activated charcoal as polarizable electrodes. Therefore they have many problems on characteristics and manufacturing.

In the one of the first type, the bonding force between the metal collectors 4 and the polarizable electrode 5 of activated charcoal is weak, and such tendencies are observed that the polarizable electrodes 5 drop off and peal off the collectors 4 or the bonding force between both ones becomes weak during use because of strain by the winding up and thereby internal resistance of the electric double layer capacitor gradually increases, to gradually decrease the capacitance. Furthermore, when the polarizable electrode 5 consisting of the activated charcoal powder and the binder are rolled onto the collectors 4, its coating efficiency is bad, and scattering of capacitance due to nonuniform coating and rolling of the polarizable electrodes 5 is given as the point to be improved. Furthermore, in conjunction with the structure, that which fulfils needs of known microelectronics, for instance of flat plate type structure, has been difficult to realize.

In order to resolve these structural defects, various proposals, for instance, raising contact strength of the polarizable electrodes 5 by roughening by blasting or the like operation, the surface of the collectors 4, or by strengthening the bonding force of the activated charcoal by adding a binder such as methyl cellulose to the activated charcoal powder, have been tried, but neither one has satisfactory points yet, though slight improvement of characteristics are observed.

Furthermore, in the one of the second type, though a flat plate type ones are obtainable enabling to respond to minimization of the appratus, there is a complicated point in working in the manufacture since powder type activated charcoal is used, and furthermore it is not satisfactory also from the view point of capacitance per volume performance.

Presently, though as the electric double layer capacitor of the second constitution the ones using an aqueous solution of sulfuric acid as the electrolyte are sold in the market, breakdown voltage per unit cell becomes 0.8 V in this type, and it does not fulfil a demand of high breakdown voltage.

Furthermore, as a modified example of the first type, an electric double layer capacitor wherein two sheets of carbon fiber are used as polarizable electrodes, and they are wound up in a roll type with a separator inbetween, and about 1 mm step is made on the opposing electrode only at the edge face and metal layer is formed by a spray method on both end faces to form collectors and lead terminals simultaneously, is devised. In the capacitor of this type, though forming of the end face electrodes become easy, the fundamental structure is the same as the conventional first type, and obtaining of further small type capacitor structure is difficult.

DISCLOSURE OF THE INVENTION

This invention provides an electric double layer capacitor utilizing an electric double layer formed at the interface between a polarizable electrode and an electrolyte, wherein carbon fibers, activated carbon fibers, or the like are used as the polarizable electrodes, and forming conductive electrodes as collectors such as a metal conductive layer formed by a spray method, a conductive paint layer formed by coating of the conductive paint or a metal foil having a conductive bond layer or the like on the polarizable electrodes of the carbon fibers or activated carbon fibers; and it is intended to obtain that which has collectors and the polarizable electrodes structure of high mechanical strength, and a large capacitance per unit volume and low internal resistance and leak current.

BRIEF DESCRIPTION OF THE DRAWINGS

FIG. 20 is an enlarged view showing collector structure of an electric double layer capacitor of the present invention, FIG. 32 is a characteristic graph showing the temperature characteristic of the capacitance of an electric double layer capacitor of the present invention.

BEST MODE FOR EMBODYING THE INVENTION

Concrete contents of the present invention are explained in accordance with FIG. 8–FIG. 34.

Figure 8:
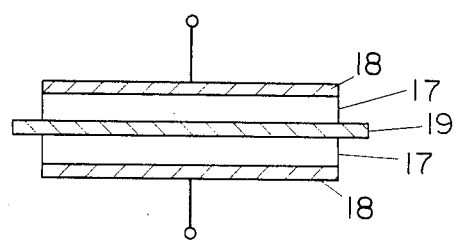
FIG. 8 is a schematic view showing the fundamental structure of an electric double layer capacitor in accordance with this invention.
Figure 9:
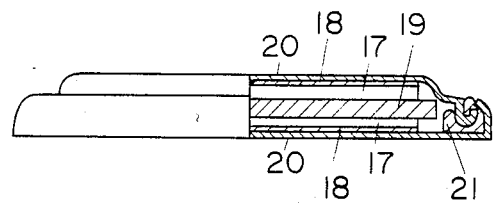
FIG. 9 is a front view showing half of the device in section of a concrete structure example of an electric double layer capacitor of this invention.

FIG. 8 shows the fundamental construction of an electric double layer capacitor in accordance with this invention; in FIG. 8, 17 is a polarizable electrode consisting of a cloth, a paper, a felt and so on consisting of carbon fiber and activated carbon fiber, 18 is a conductive electrode formed on the polarizable electrode 17. One pair of the polarizable electrode 17 comprising the conductive electrode 18 are disposed to oppose each other with electrolyte-soaked separator 19 inbetween.

FIG. 19 is a view showing the representative example of outside forming of the electric double layer capacitor of this invention. A capacitor element comprised of polarizable electrodes 17 made of activated carbon cloth, conductive electrodes 18 and a separator 19 is enclosed in a pair of metal cases 20 making a pair with two pieces, to form a coin type. 21 is an insulative gasket ring for carrying out insulation and sealing between the metal cases 20, and with this insulative gasket ring 21 inbetween the pair of metal cases 20 are connected. That is, each of the conductive electrodes 18 formed on the polarizable electrodes 17 electrically contacts the inside face of each of the metal cases 20, and in this embodiment the metal cases 20 become electrodes for output taking out.

Figure 10:
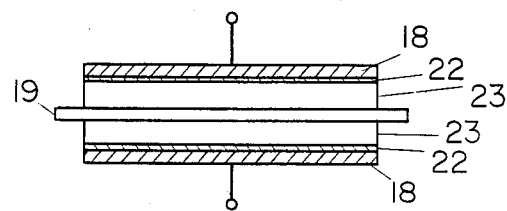
FIG. 10 is a schematic view showing a second fundamental construction of an electric double layer capacitor of this invention.

In FIG. 10, another embodiment of this invention is shown. In this embodiment, polarizable electrodes are constituted by activated carbon fiber 23 carrying electric conductivity improving agent 22 such as conductive paint for raising conductivity. Incidentally, the conductivity improving agent 22 may be provided on the activated carbon fiber 23 not only on the face of the side of the conductive electrode 18 but also to the other face and on whole body.

Nextly, the characteristic and contents are described in detail individually on respective component elements of the electric double layer capacitor of this invention.

(1) Polarizable Electrode

Properties demanded when activated carbon fibers or carbon fibers are used as the polarizable electrode are: ① surface area per unit weight is large, ② electric resistance is small, ③ mechanical strength is high, ④ resistivity against chemicals is high. Conventional activated carbon powder has the properties of ①, ②, and ④, but the activated carbon powder and carbon fiber have, in addition to the above-mentioned, a mechanical strength as electrodes ③ and is very effective material. Activated carbon fiber fulfilling such demand comprises four kinds, phenol kind (cured novolak fibers), rayon kind, acryl kind and pitch kind. Table 1 shows properties of these four kinds activated carbon and coconut-granule activated charcoal.

TABLE 1

|  | Phenol | Rayon | Acryl | Pitch | Coconut granule charcoal |
|---|---|---|---|---|---|
| Surface area (m$^2$/g) | 1500–2000 | 1400 | 900 | 700 | 800 |
| Tensile strengths (Kg/mm$^2$) | 50–70 | 5–10 | 200–250 | 60 | — |
| Tensile modulus of elasticity (Kg/mm$^2$) | 2000–3000 | 1000–2000 | 2000–3000 | 3000–3500 | — |
| Specific electric resistance ($\times 10^{-5}\Omega$-cm) | 1000–3000 | 2000–3000 | 800–1000 | 2000–3000 | — |
| Electrode types |  |  |  |  |  |
| Felt type, | Possible | Possible | Possible | Possible | Impossible |

TABLE 1-continued

| | Phenol | Rayon | Acryl | Pitch | Coconut granule charcoal |
|---|---|---|---|---|---|
| mat type | | | | | |
| Cloth type (plane, twilled) | Possible | Impossible | Impossible | Impossible | Impossible |
| Paper type | Possible | Possible | Impossible | Impossible | Possible |
| Principal properties of carbon fibers as polarizable electrode | Strong and flexible, most suitable as electrode | Hard and relatively fragile | Hard and relatively fragile, but in better than coconut granule charcoal | Hard and relatively fragile, but in better than coconut granule charcoal | To make a thin type electrode a collector is necessary and hence, capacitance performance is very small |

As shown in Table 1, acryl kind and pitch kind generally somewhat lacks flexibility, and specific surface area is fairly small. Though rayon kind has a large specific surface area, its fiber is fragile; and though the felt type carbon fiber is popular, it is difficult to be made into paper, and thus a paper type is impossible, and it has problems in resistivity against chemicals and resistivity against water. On the other hand, the phenol kind of carbon fibers utilize cured novolak fibers as the material, and in the case of the phenol kind of carbon fibers, because the cured novolak fibers are insoluble and have only a small heat shrinkage, there is no need for preliminarily making the material fiber insoluble, and the woven or non-woven cloth can be made into the activated carbon as they are, and besides they are strong and superior in flexibility, and therefore they are especially superior as the polarizable electrodes of the electric double layer capacitor.

It is observed that making of papers from phenol kind carbon fibers as the material has various advantages, and especially the ones made by using special Kynol (trade name of a phenol kind of carbon fibers from Nippon Kynol Inc.) as the material has superior characteristics in various aspects such as flexibility, electric resistance, water resistivity, chemical resistivity, strength against winding working, working accuracy, electric capacitance, cost and so on.

Nextly, description is made on structure of micro-pores of activated carbon fibers most suitable for the polarizable electrode of electric double layer capacitor.

Activated charcoal, which hitherto has been used as polarizable electrode of electric double layer capacitor, has a specific surface area of 300–3000 m$^2$/gr, and when considering that the electric double layer capacitance, in case mercury is used as polarizable electrode is 20–40 $\mu$F/cm$^2$, a large capacitance or 60–1200 F per 1 gr of the activated charcoal must be obtainable in theory. However, in the conventional electric double layer capacitor, capacitance per unit weight of the activated charcoal has been taken out only 1/30–1/10 of the above-mentioned theoretical value.

Figure 11:
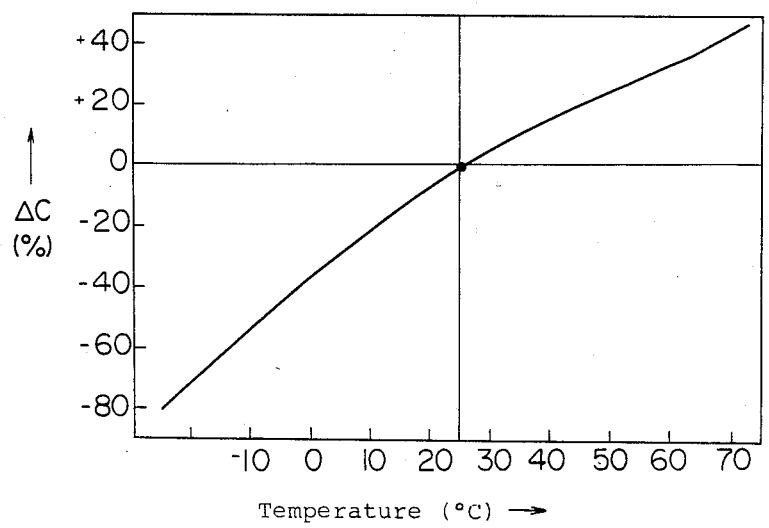
FIG. 11 is a characteristic chart showing the temperature characteristic of capacitance of the conventional electric double layer capacitor.

Furthermore, when the temperature characteristic of the stored capacitance of the electric double layer capacitor is noted, especially in case of the capacitors wherein the surface area utilization factor is bad, temperature dependency of the capacitance change rate $\Delta C$ becomes very large as shown in FIG. 11, resulting in what is considered an electric double layer capacitor having a poor temperature characteristic.

Figure 12:
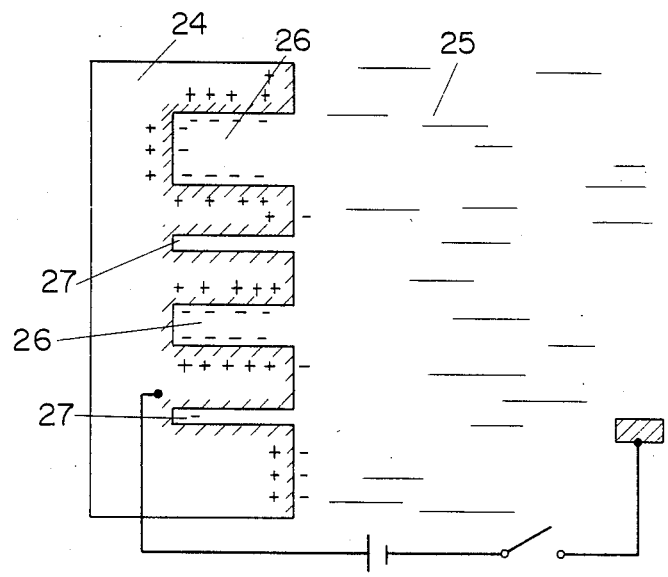
FIG. 12 is a schematic view showing an activated carbon-electrolyte interface showing a relation between diameters of micro-pores of the activated carbon and the electric double layer.

Such poorness of the utilization factor of the area of the activated charcoal and poorness of the temperature dependency induced thereby is considered as being induced by distribution of the diameter of the micro-pores of the activated charcoal used, as below-mentioned. FIG. 12 is a schematic chart of an electric double layer formed on surface of the activated charcoal, and when an electric field is applied between the activated charcoal substrate 24 and electrolyte 25 containing thereto, an electric charge is stored at the surface of the activated charcoal substrate 24, and the depth of the interface electric double layer is about 10 Å. Accordingly, as shown in FIG. 12, in a micro-pore 26 having a diameter larger than 10×2=20 Å, the electric double layer is formed up to the inside of the micro-pore 26 and the electric double layer capacitance is stored up to the inside surface of the micro-pore 26, while for micropore 27 of 20 Å or smaller no electric double layer is formed between its inside wall and the electrolyte. In other words, no matter how the specific surface area per unit weight is induced by micro-pores of the diameter of 20 Å or smaller is used as the polarizable electrode, the utilization factor of the surface area becomes very bad.

Futhermore, when the temperature characteristics of the easiness of diffusion of the electrolyte into the micro-pores and thickness of the electric double layer are considered, it is understood that temperature dependency of the electric double layer capacitance formed on the surface of the activated charcoal having many micro-pores of small diameter becomes very large, as compared with that of the activated charcoal having micro-pores of large inner diameters as a major proportion.

By considering the above, the structure of the micro-pores of the activated carbon fibers required as the polarizable electrode is that the specific surface area is large and besides there are many micro-pores having diameters of 20 Å or larger. Nextly, a manufacturing method of the activated carbon fiber having such micro-pores structure is described.

Figure 13:
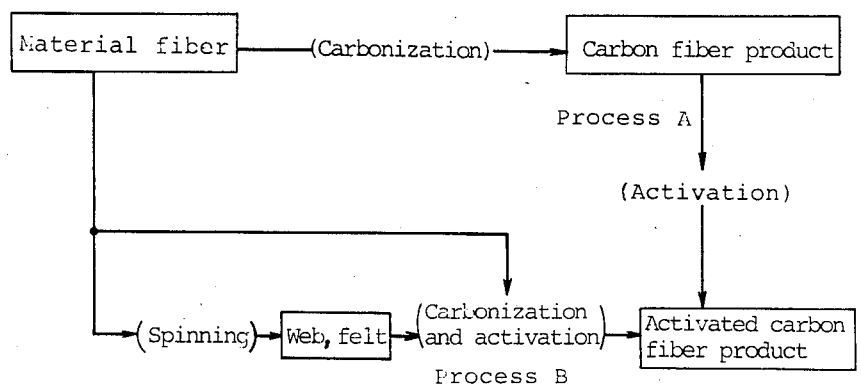
FIG. 13 is a process chart showing manufacturing process of the activated carbon fiber.

FIG. 13 is manufacturing process diagram of general activated carbon fibers. That is, there is a method that material fibers are directly made, carbonized and activated, and a method that once carbon fiber is made and subsequently activated. Such activation of the carbon fibers (steps A and B in FIG. 11) is carried out in general in a mixed gas consisting of water vapor and nitrogen at a temperature of 700° C.–800° C. Thereupon, when metal ions coexist in the material fiber during such activation, the diameter of the micro-pores of the activated carbon fibers after activation can be controlled. That is, as compared with the case activated by the water vapor only, micro-pores having inner diameters proportional to the diameters of metal ions used the catalyst are formed. Metal ions suitable for coexistence are lithium, sodium, potassium calcium, magnesium, zinc and so on, and when metal ions of the larger ion radius are used as catalyst, the micro-pores of the larger diameters are obtainable. Actually, salts (chlorides, phosphates, nitrates, etc.) or hydroxides of these metal ions are carried on the material fiber, to activate.

Figure 14:
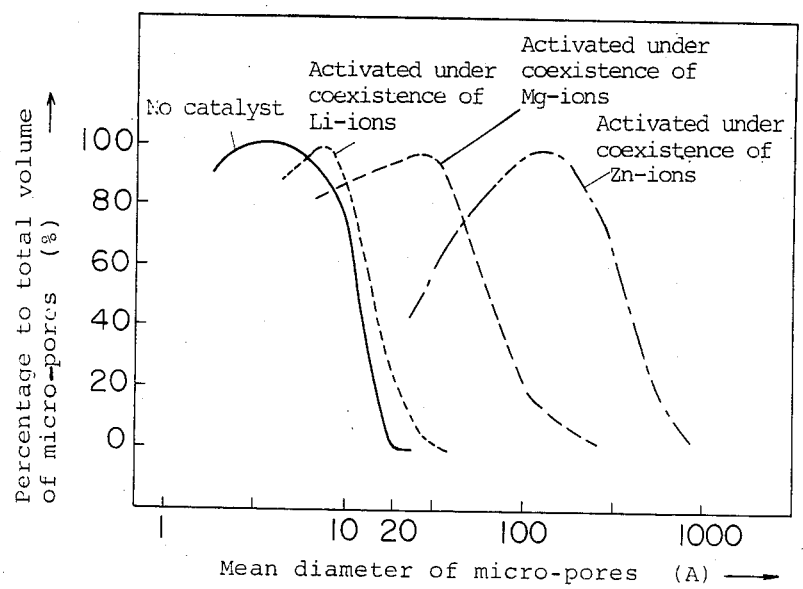
FIG. 14 is a characteristic chart showing a relation between the activation process of the activated carbon and pore size distribution.

FIG. 14 shows the pore size distribution of activated carbon fibers after activation, drawn individually for each catalyst used, and as is shown, especially when salts or hydroxides of the alkali earth metals are used as the activation catalyst, distribution rate of the micro-pores of diameter above 20 Å becomes large.

Furthermore, specific surface area is in an inverse proportional relation to electric resistance and softness, and as the activation is done the surface area increases, carbonization yield decreases, resistance increases and it mechanically becomes fragile. In the fibers wherein the micro-pores of 20 Å or smaller is of the majority and the surface area utilization factor is bad, the activation must proceed until a large specific surface area is obtained, then even though a satisfactory value as the capacitance value is obtained as a result, it makes a polarizable electrode with high resistance and weak mechanical strength. However, in case the activation catalyst is used like the present invention, the surface area utilization factor very much improves, and hence there is no need of advancing the activation extremely to obtain a unit capacitance, and the activated carbon cloth obtained in this way as such has low resistance and high strength. Furthermore, since the activated carbon fiber has low resistance and large diameter of the micro-pores, it has a feature that the internal resistance of the capacitor becomes very low.

As is described below, when considering to provide the polarizable electrode by die-cutting of the activated carbon cloth, that mechanical strength of the activated carbon cloth becomes a strong means that the manufacturing process becomes easy, and the activated carbon cloth of the present invention is very much advantageous in manufacturing process, too.

Furthermore, with respect to the ratio of the micro-pores of the diameter of 20 Å or more to the whole micro-pores, when the total of the inside-surface area of the micro-pores is less than 1% of the total inside-surface area of the whole micro-pores, its special effect can not be expected much, and in case the inside-surface area of the micro-pores of the inside diameter of 20 Å or more becomes 1% or more its effect becomes prominent.

(2) Conductive Electrode

Conductive electrodes used in this invention is conductive layers formed on the polarizable electrode directly by plasma spraying, arc spraying, vacuum deposition, sputtering, non-electrolytic plating, etc. Furthermore, metal foil with a conductive bond inbetween or a conductive paint is suitable for the electrodes. Specifically for its strength, conductivity and easiness of forming, the metal layer formed by the plasma spray or arc spray method or metal foil with a conductive bond inbetween is suitable for the electrodes.

Firstly, eletrodes made by the spray method are described. As the conductive material used here there are, aluminum, nickel, copper, zinc, tin, lead, titanium, tantalum, and the like which are electro-chemically stable against electrolyte. Deposition weight by the spraying of 0.05 mgr/cm$^2$–500 mgr/cm$^2$ is appropriate. This value does not apply for other deposition methods. In the spray method, under this range, electric resistance is high and function as electrodes is not performed. Furthermore, above this range, the electrodes become too thick, and are likely to peal off or drop out from the carbon fibers, or forming cracks in the spray metal layer, and mechanical strength becomes weak oppositely. That is, polarizable carbon fiber electrodes having the appropriate amount of collected sprayed layer comprises such mechanical strength and proper characteristic of the activated carbon, and besides in comparison with the case by the conventional paste method, handling in manufacturing is very easy, and resultantly, as will be described in the below-mentioned embodiment, a coin type flat sheet-shaped electric double layer capacitor is obtainable.

Figure 15:
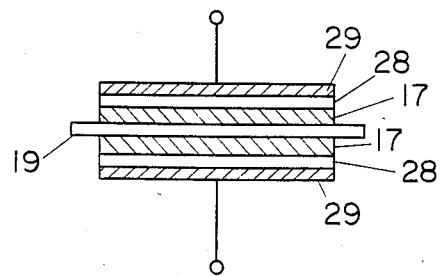
FIG. 15 is a structure view showing another example of an electric double layer capacitor of the present invention.
Figure 16:
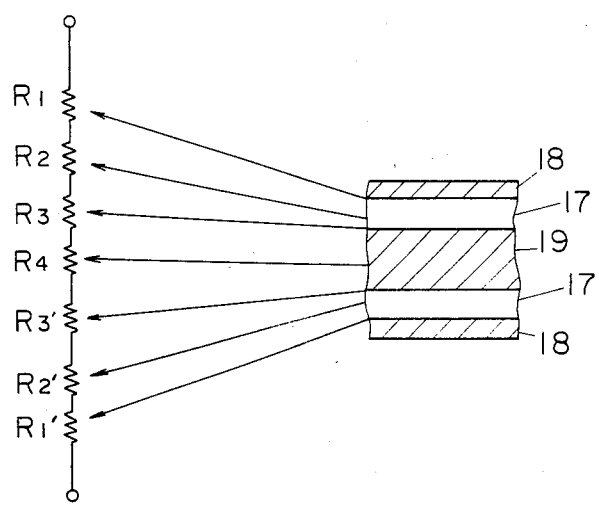
FIG. 16 is an equivalent circuit diagram of the resistance of the electric double layer capacitor.

As the conductive electrodes, besides such metal layer formed by the spray method, a method shown in FIG. 15 is possible. That is, it is an electrode structure, wherein, on polarizable electrode 17 made of activated carbon fiber, a metal foil 29 of the same material as the sprayed metal, is provided with a conductive binder 28, for instance what is made by dispersing carbon, silver or copper in an organic resin such as epoxy resin, phenol resin, acryl resin, silicone resin, and so on.

Conductive electrodes of this structure also, in case of application in the electric double layer capacitor of, for instance, a coin type flat sheet shape, electrically contact the conductive electrodes as will be described in the below-mentioned embodiment.

Furthermore, they the conductive electrodes, they may be formed by applying conductive paint having conductive pulpherized powders of silver, copper, carbon, or the like dispersed an organic resin.

Figure 17:
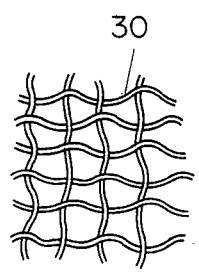
FIG. 17 is an enlarged view of an activated carbon cloth.
Figure 18:
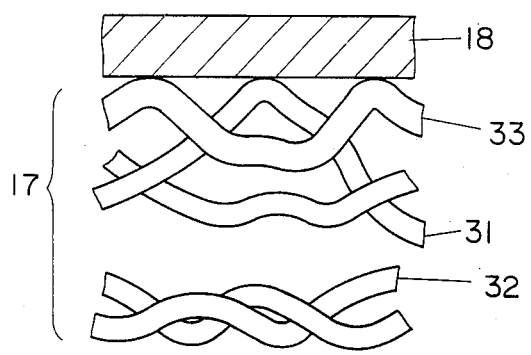
FIG. 18 is an enlarged view showing the positional relation between activated the carbon fiber and the conductive electrode in a polarizable electrode, FIG. 19, A and B are enlarged views showing microstructures of activated carbon fibers for use in an electric double layer capacitor of the present invention.

Next, another important characteristic with respect to the conductive electrodes is described. FIG. 10 is a drawing to show the fundamental structure of an electric double layer capacitor of the present invention comprising an electric conductivity improving agent 22, wherein when attention is paid on the internal resistance of the capacitor, with respect to a capacitor of a structure shown in FIG. 8, its internal resistance is divided into individual components as in FIG. 16. That is, these are contact resistance $R_1$ between the conductive electrode 18 and a polarizable electrode 17, resistance $R_2$ in the polarizable electrode 17 and interface resistance $R_3$ between the polarizable electrode 17 and an electrolyte impregnating in the separator 19, a resistance $R_4$ of the electrolyte and $R_3'$, $R_2'$ and $R_1'$ which exist in symmetry to these. Those using the carbon fiber as the polarizable electrode as this invention, as shown in FIG. 17, since such cloth that has the activated carbon fibers 30, entangled in each other in a diagonal or plain fabric is used, the density of the carbon fiber per unit area of the cloth becomes low. Accordingly, as compared with one with polarizable electrodes using a powder activated carbon type, resistances become large in every direction, thicknesswise and planewise. Furthermore, though it can not be denied that leading of the electric double layer capacitance of the interface between the polarizable electrode 17 at the micro-pores parts 31 of the activated carbon fiber and the electrolyte 32, to the conductive electrode 18, by relying on a conductivity only by the activated carbon fiber 33 and by contacts and connections between them, results in making the $R_2$ and $R_2'$ high resistance. However, the problem on these internal resistance becomes prominent in the coin type capacitors having small polarizable electrode area.

From these view points, when the surface of the polarizable electrode as shown in FIG. 10 is shown by enlarging, it becomes as of A and B of FIG. 19. As shown in A of the same figure, conductivity improving agent 22 is born on all the surface of the activated carbon fiber 33, and as shown in FIG. B the micro-pore parts 34 of the activated carbon fibers are also coated by the conductivity improving agent 22.

As the conductivity improving agent to be used here, three kinds are considered: ① oxides of transition metals such as ruthenium, osmium, iridium, indium, plutinum, etc., ② conductive paint made by dispersing carbon granules or other metal granules in organic resin or carboxy methyl cellulose or the like, ③ conductive metal layer of tin oxide or indium oxide formed by vapor deposition, sputtering or the like. At the interface between the polarizable electrode and the electrolyte, it is an essential condition that only a reaction to form the electric double layer takes place, and when chemical and electric stability of the polarizable electrode are considered, uses of these stable oxide of conductive transfer metals or conductive paint or furthermore, conductive oxide such as tin oxide, as the conductivity improving agent.

Furthermore, when, for instance, the activated carbon fibers are dipped in an aqueous solution of ruthenium chloride for a predetermined time and the above is thermally decomposed by keeping the aqueous solution of ruthenium chloride sufficiently soaking in the micro-pores in the activated carbon fiber, a layer of ruthenium oxide is coated to the inner wall of the micro-pores even to the extremely microscopic ones of the activated carbon fibers.

By using the polarizable electrode of the activated carbon fiber 33 having such conductivity improving agent 22 on its surface, as is understood from comparison between, for instance, resistance $10^{-1}\Omega\cdot\text{cm}$–$10\Omega\cdot\text{cm}$ of the activated carbon fibers and resistance $10^{-5}\Omega\cdot\text{cm}$ of ruthenium oxide, low resistance layer becomes to be formed on the surface of the activated carbon fibers 33, and as shown in FIG. 20, electric double layer formed on the inside surface of the activated carbon fibers 33 is connected with low resistance to the conductive electrode 18 through conductivity improving agent 22 formed on the surface.

As a result, resistance $R_2$ in the above-mentioned polarizable electrode, namely the resistance in the activated carbon fibers, furthermore the contact resistance $R_3$ between the polarizable electrode and the electrolyte or contact resistance $R_1$ between the polarizable electrode and the collector electrode becomes also small, and internal resistance of the electric double layer capacitor can be very much decreased.

Furthermore, as above-mentioned, in case the conductivity improving agent is formed by using a thermally decomposable salt such as ruthenium salt, electrode lead out of the micro-pores of activated carbon fibers can be easily made, and accordingly surface area utilization factor of this part is also increased.

Besides, forming methods of the conductivity improving agent to be used in this invention are as follows: ① dipping and thermal decomposition of thermally decomposable salt such as ruthenium chloride, ② painting or dipping method of carbon colloid solution, ③ forming by vacuum deposition of conductive oxide such as tin oxide. When formation of the conductivity improving agent in the micro-pores of the activated carbon is considered, the method of ③ is disadvantageous, but when contemplating kinds and heat resistivity of the activated carbon fiber to be used, any of the method ①, ②, ③, has respective features, and can achieve more superior characteristics than the electric double layer capacitor not provided with the conductivity improving agent.

(3) Electrolyte

The electrolyte to be used in this invention comprises as its one component thereof, at least 1,2-dimethoxyethane.

Figure 1:
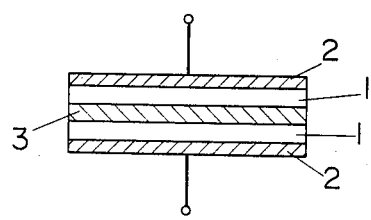
FIG. 1 is a structure view showing the fundamental structure of an electric double layer capacitor.
Figure 2:
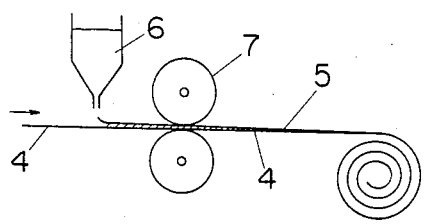
FIG. 2 is a process view showing a substantial part of the manufacturing process of the conventional electric double layer capacitor.
Figure 3:
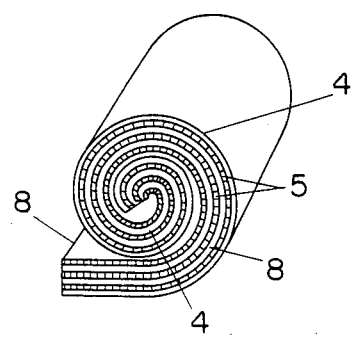
FIG. 3 is a perspective view showing the essential structure of the conventional electric double layer capacitor.
Figure 4:
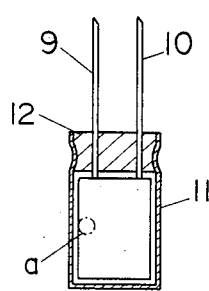
FIG. 4 is a sectional view of a whole structure of the same electric double layer capacitor.
Figure 5:
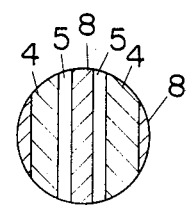
FIG. 5 is an enlarged view of a part of FIG. 4.

As electrolytes for conventional electric double layer capacitor shown in FIG. 4 and FIG. 5, by considering permeability, conductivity, chemical and thermal stability, that which is made by dissolving tetramethylammoniumperchlorate, ammoniumperchlorate or the like in solvent such as propylene carbonate, dimethylformamide, γ-butyrolactone, or tetrahydrofuran or the like have been used. However, with such combination of the conventional electrolyte and activated charcoal, due to low permeability of the electrolyte to the activated charcoal and high viscosity, impregnation of the electrolyte into the pores of the activated charcoal is not completely done, and this becomes the reason to hinder effective utilization of the surface area like the case of the aforementioned distribution characteristic of the micro-pores of the activated carbon fibers.

Figure 21:
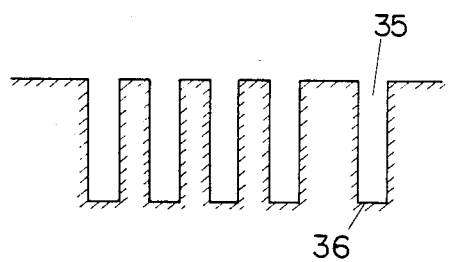
FIG. 21 is a schematic view showing pores of activated carbon fiber of a high specific surface area.

FIG. 21 is a view showing micro-structure of the activated carbon fiber of phenol kind. Among the micro-pores 35 of the activated carbon fibers, the micro-pores to contribute formation of the electric double layer is the micro-pores of cylindrical shape with diameters of several tens Å-several μm, and in order to effectively utilize the surface area of this micro-pores an electrolyte which can reach through at least the micro-pores of the diameter of several tens Å-several μm to the bottom 36 of the micro-pores 35.

1,2-dimethoxyethane to be used in this invention is a dimethylether of ethylene glycol, and dissolves in the water, alcohol and hydrocarbon, but is a stable liquid having the boiling point at 82° C.–83° C. γ-butyrolactone, tetrahydrofuran, dimethylformamide or propylene carbonate which has been hitherto used as solvent for electrolyte of electric double layer capacitor has poor permeability into the micro-pores because of its molecular radius or three dimensional hindrance due to having carbonyl group, amino group with methyl group or cyclic construction. In contrast to that, the 1,2-dimethoxyethane are of low molecular number and has ether structure, hence substantially of straight chain type. Accordingly, the permeability into the micro-pore is superior than the conventional ones, and especially is effective in effective utilization of the surface area of the activated carbon fibers having cylindrical type micro-pores as above-mentioned.

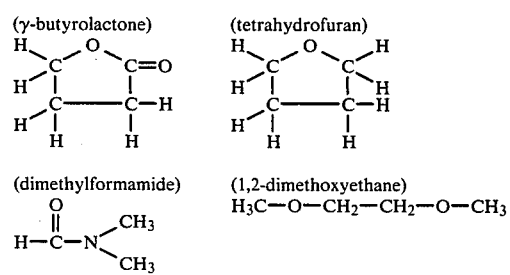

Nextly, the effect of combination of 1,2-dimethoxyethane and activated carbon fiber of relatively large surface area is described in concrete.

Figure 22:
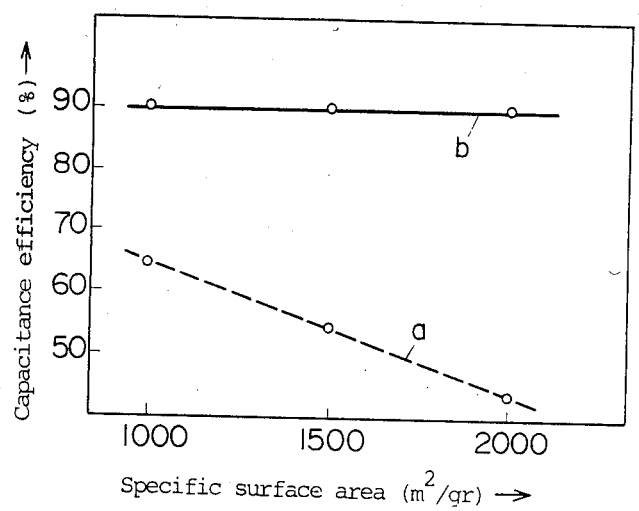
FIG. 22 and FIG. 23 are characteristic graphs showing the relation between specific surface area of the activated carbon and capacitance efficiency of the electric double layer.

FIG. 22 shows capacitance efficiency (the capacitance efficiency to be referred to here is a value when considering only such micro-pores that has possibility of contributing to formation of electric double layers) which is to be taken out when activated carbon fibers of three types of specific surface areas (1000 m²/gr, 1500 m²/gr and 2000 m²/gr) are used as polarizable electrodes, with respect to the case "a" where propylene carbonate is used as electrolyte solvent, the case "b" where both 1,2-dimethoxyethane and propylene carbonate are used in this invention. From FIG. 22, it is understood that when propylene carbonate is used as electrolyte solvent, even when the specific surface area of the polarizable electrode is increased from 1000 m²/gr to 2000 m²/gr, capacitance value does not substantially increase, or even decreases. In contrast to this, when 1,2-dimethoxyethane is used also as the electrolyte solvent, when the specific surface area of the activated carbon fiber increases the capacitance value also increases in proportion thereto, and ratio of the capacitance of the case using the activated carbon of 1000 m²/gr and that of the case using the activated carbon of 2000 m²/gr is about 1:2.

Figure 23:
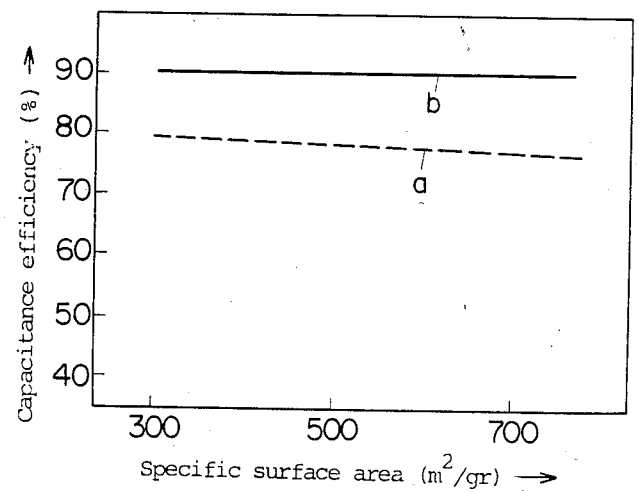

FIG. 23 shows a relation between the surface area and capacitance efficiency when coconut activated charcoal powders (300 m²/gr, 500 m²/gr and 700 m²/gr) are used as the polarizable electrodes and propylene carbonate is used as the electrolyte. That is, when a low surface area material as the coconut activated charcoal granules used as the polarizable electrode, even in the case "a" when propylene carbonate is used as the electrolyte solvent it fairly serves the function. Also, as shown by the characteristic "b", even in case the low surface area material is used as the polarizable electrode, the effect of 1,2-dimethoxyethane is obtainable. These experimental facts support the consideration on the above-mentioned relation about the shape of micro-pores of activated carbon fibers of high specific surface area, and permeability of the electrolyte against efficiency for taking out capacitance; and use of 1,2-dimethoxyethane as the electrolyte solvent is desirable.

As a means for further making the effect of the 1,2-dimethoxyethane more prominent, a use of vacuum impregnation method in permeating electrolyte into the activated carbon fiber is also an effective means. Furthermore, after forming conductive electrodes as cathode collector on graphite fibers of novolak group by a means such as plasma spraying, an electrolyte containing a solvent consisting of propylene carbonate and 1,2-dimethoxyethane by the vacuum diffusion method is also effective.

Nextly, laminated type capacitor wherein plural number of hitherto-described unit capacitor elements are laminated and metal-sprayed layer is formed on the end face to take out the whole electrodes. Capacitors of such structure is classified into the following two types. That is, they are a first type having unit capacitor element of a combination of polarizable electrodes and a separator, and a second type having a unit capacitor element of a combination of one polarizable electrode, one separator and one nonpolarizable electrode.

Figure 24:
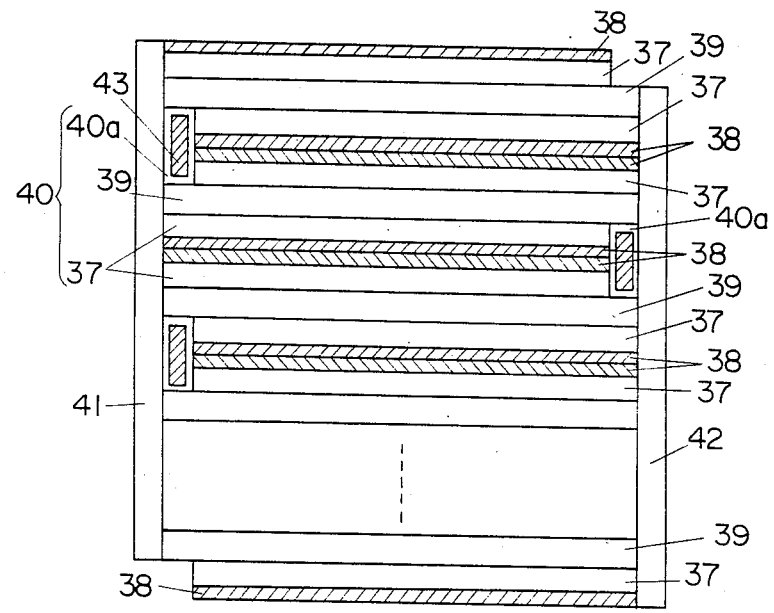
FIG. 24 and FIG. 25 are sectional views showing structural example of a laminated type electric double layer capacitor of the present invention, FIG. 26, A and B are sectional views showing method of forming the end face electrodes of a laminated type electric double layer capacitor

FIG. 24 shows fundamental structure drawing of the first type one.

A polarizable electrodes 37 consisting of cloth, paper or felt of carbon fibers or activated carbon fibers, conductive electrode 38 formed on one side of the polarizable electrode 37 and a separator 39 soaked with electrolyte and disposed between the polarizable electrodes 37 constitute a composition which forms a unit capacitor element 40. In the unit capacitor element 40, the polarizable electrodes 37 are disposed in a manner to form margin part 40a whereat conductive electrodes 38 do not face each other. At this time, the conductive electrodes 38 functions as the collector electrode. n pieces of the unit capacitor elements 40 are, alternatively laminated as shown in FIG. 24, and metal layers 41, 42 are provided on both ends of the laminated body to form collected electrodes for outside leading out. At this time, it is more preferable to make insulation between neighboring unit capacitor elements 40 by putting an insulation spacer 43 or the like inbetween.

Figure 25:
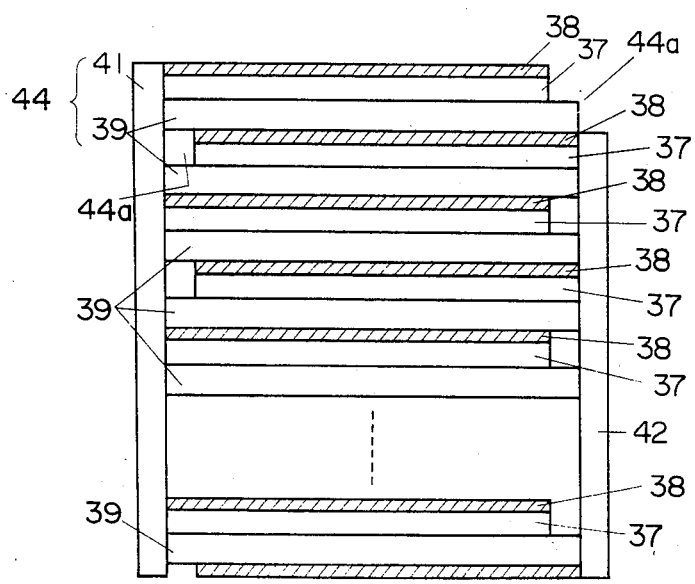

FIG. 25 shows fundamental structure drawing of the second type one.

A combination body of polarizable electrodes 37 consisting of fabric, paper or felt of carbon fibers or activated carbon fibers and separators 39 soaked with electrolyte constitute a unitary capacitor element 44; and in this unitary capacitor element, in the polarizable electrodes 37 which are opposing with the separator 39 inbetween, the conductive electrode 38 having one polarizable electrode 37 formed thereon is disposed to the side of the separator 39. The unit capacitors 44 are as shown in FIG. 25, laminated of their n pieces with separator 39 inbetween and on both sides of this laminated body, metal layers 41 and 42 are provided. Furthermore, also, in the unit capacitor element 44, margin parts 44a, whereat conductive electrodes 38 of the polarizable electrodes 37 do not oppose each other, are provided on both ends.

In the electric double layer capacitor of this structure, the conductive electrodes 38 function as collector electrodes, and the conductive electrodes 38 contacting the separator 39 functions as non-polarizable electrodes, thereby constituting respective unit capacitor elements.

Nextly, electrode lead out of such laminated capacitor is described. As has been described, for leading out end faces of the collector electrodes of unit capacitor group, two metal layers for electrodes of the whole capacitor exist. These metal layers are formed in a manner that, for every other capacitor elements, electrode leading-outs are formed on the same side, and it is necessary to be formed in a manner that electrodes of the neighboring unit capacitor elements do not contact each other.

Figure 26:
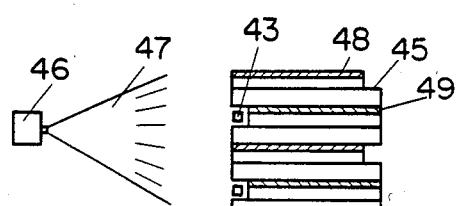
Figure 26:
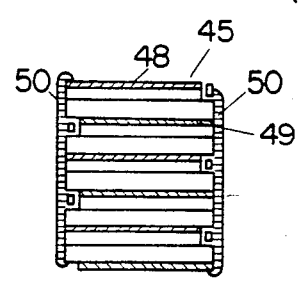
Figure 27:
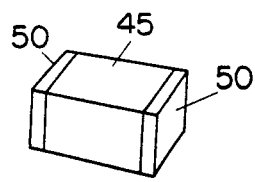
FIG. 27 through FIG. 30 are perspective views and a sectional view showing an embodiment of a laminated type electric double layer capacitor, FIG. 31, A-D are a process chart showing the manufacturing process of a coin type electric double layer capacitor of the present invention.
Figure 28:
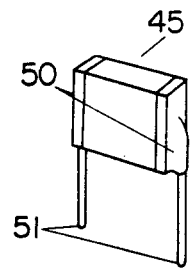
Figure 29:
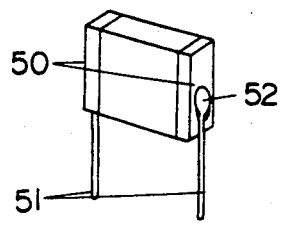

As a means to achieve this purpose, it is desirable to form the collector electrodes by plasma spraying method or the like. A and B of FIG. 26 are cases of spraying metal powder 47 onto the main body 45 consisting of laminated unit capacitor element group by using spraying gun 46. In this time, insulation spacers 43 may be provided in order that electrodes 48 and 49 of the neighboring unit capacitor elements do not make conduction. And in FIG. 25b, only electrodes designated by the hatching of the same direction are made contact with the sprayed electrodes 50. FIG. 27–FIG. 30 show an example of completed state of this laminated type capacitor, and making in face bonding type as shown in FIG. 27 or making in that metal lead wires 51 are disposed on both end faces of the main body 45 of the capacitor when sprayed electrode 50 is formed to be buried in the sprayed electrodes, or made in a manner that after forming the sprayed electrode 50 as shown in FIG. 29, metal lead wires 51 are connected to the metal deposited electrodes 50 by silver paint or solder 52, can be considered. Covering is made for all of these by encapsulating the whole body into a case of resin, metal or ceramic, or dipping in the resin.

Figure 30:
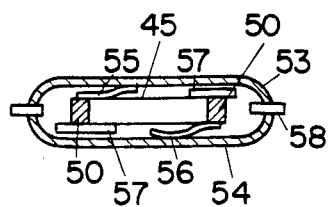

One example when the outside forming is made by case is shown in FIG. 30, and in this example lead pieces 55, 56 are spot-welded on the inside face of two metal cases 53, 54 of disk shape, and the metal cases 53 and 54 are combined in a manner that the capacitor main body 45 is encircled therewith and respective lead pieces 55, 56 of the metal cases 53, 54 are electrically connected to the sprayed electrodes 50 of the capacitor main body. 57 are insulation spacers to prevent direct contacting of the sprayed electrodes 50 of the main body 45 of the capacitor to the metal cases 53, 54; and 58 is a gasket for preventing contacting of the metal cases 53, 54 to each other.

Nextly, concrete embodiments of the present invention are described.

EMBODIMENT 1

As shown in A-D of FIG. 31, on each surface of polarizable electrodes 59 consisting of cloth made of activated carbon fibers of phenol kind (thickness 0.3 mm, specific surface area 2000 $m^2/gr$) and a cloth made of activated carbon fibers of acryl kind (thickness 0.3 mm, specific surface area 800 $m^2/gr$), an aluminum layer 60 of thickness 5 $\mu m$ is formed by plasma spraying method. This double layer structure 61 is die-cut into disks having 2 cm diameter to provide electrode body 62. After soaking in the electrode bodies 62 an electrolyte of a mixed solution of propylene carbonate 30 wt % and γ-butyrolactone 70 wt % with addition of 10 wt % of tetraethylammoniumperchlorate, laminating a separator 63 inbetween and further, pinching it with two cases 64 of steinless steel, and disposing a gasket 65 at the opening end of the cases 64 and also caulking are made to seal.

Figure 6:
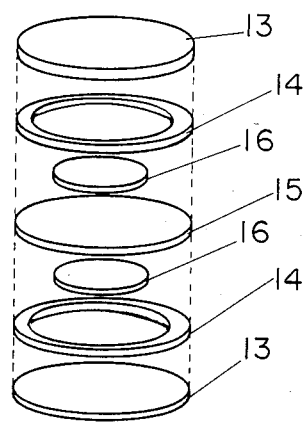
FIG. 6 is an exploded perspective view showing another electric double layer capacitor.
Figure 7:
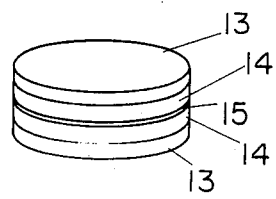
FIG. 7 is a perspective view showing the completed state of the same electric double layer capacitor.

Several characteristics of electric double layer capacitor in accordance with this invention are shown in Table 2. Table 2 also shows characteristics of trially made product of the same shape as the structure of FIG. 4 wherein activated charcoal paste is coated on the punching metal collector body and the structure of FIG. 6, for the sake of comparison.

TABLE 2

|  | Activated/carbon charcoal used | Capacitance | Internal resistance | Withstand voltage | High temperature load life at 1.7 V, 70° C., 1000/hr. (Capacitance change) |
|---|---|---|---|---|---|
| Product of the present invention | Activated carbon fiber of phenol group | 3 F | 0.15 Ω | 2 V | −3% |
|  | Activated carbon fiber of acryl group | 1.5 F | 0.15 Ω | 2 V | −3% |
| Conventional product | Paste of activated charcoal powder applied on aluminum expanded metal | 0.8 F | 0.3 Ω | 2 V | −20% |
|  | Activated charcoal powder with sulfuric acid | 0.8 F | 0.1 | 0.8 V | −20% |

EMBODIMENT 2

In a cloth of phenolic fibers, aqueous solution of zinc chloride is soaked to be born. At this time, the amount of born NaOH is made to be 10% of the whole fiber weight. The fiber thus treated is kept in a furnace of 1000° C., to be carbonized and activated. By controlling the time of retention in the furnace, activated carbon fiber cloths of three kinds of specific surface areas of 300 $m^2/gm$ (30 min. retention), 500 $m^2/gr$ (1.5 hrs. retention) and 1500 $m^2/gm$ (3 hrs. retention) are obtained. Furthermore, aluminum metal layer of 50 $\mu m$ thickness is formed by plasma spray method and thereafter is die-cut into circle-shaped ones of 5 mm diameter. On this circle-shaped electrode body, electrolyte of mixed solvent of propylene carbonate 30 wt % and γ-butyllactone 70 wt % with addition of 10 wt % tetraethylammoniumperchlorate is soaked, and putting a separator made of polypropylene between two sheets of the electrodes, outside forming is made by using the cases of steinless steel and gasket.

Table 3 shows characteristics of an electric double layer capacitor of this embodiment. Incidentally, characteristics of electric double layer capacitor using an activated carbon cloth, activated without using the activation catalyst are also described for comparison in the same table. Furthermore, FIG. 32 shows temperature characteristic (−25° C., 25° C. and 70° C.) of values of capacitance change rates ΔC of the ones using the activated carbon cloth of specific surface area 500 $m^2/gr$ among the cases of both.

TABLE 3

| | Property of activated carbon cloth | | | Characteristics of electric double layer capacitor | |
|---|---|---|---|---|---|
| | Specific surface area by BET | Strength | Proportion of micro-pores of diameter over 20Å | Capacitance | Internal resistance |
| Product of the invention | 300 $m^2/gr$ | Strong | 50% | 8 F | 1 Ω |
| | 500 $m^2/gr$ | Strong | 50% | 8 F | 1 Ω |
| | 1500 $m^2/gr$ | Strong | 80% | 10 F | 1 Ω |
| Comparison example | 300 $m^2/gr$ | Strong | Below 1% | 0.01 F | 8 Ω |
| | 500 $m^2/gr$ | Weak | Below 1% | 0.05 F | 8 Ω |

TABLE 3-continued

| Property of activated carbon cloth | | | Characteristics of electric double layer capacitor | |
|---|---|---|---|---|
| Specific surface area by BET | Strength | Proportion of micro-pores of diameter over 20Å | Capacitance | Internal resistance |
| 1500 m²/gr | Weak | Below 1% | 0.2 F | 10 Ω |

EMBODIMENT 3

Cloth of activated carbon of thickness 0.2 mm woven by activated carbon fibers of novolak kind is dipped in aqueous solution of ruthenium chloride of 0.5 mole/l for 5 min., and thereafter is retained in a furnace of 300° C. to coat the surface of activated carbon fiber by ruthenium oxide layer. After forming aluminum layer (20 μm thickness) by plasma spraying method on thus formed cloth of the carbon fibers, it is die-cut into circle-shape with diameter of 20 mm. Between two sheets of this circle-shaped electrodes, a separator made of polypropylene is put and they are laminated, and as electrolyte mixed solution of propylene carbonate, γ-butyrolactone and tetraethylammoniumpeechlorate is injected, and they are encapsulated in metal cases with gasket inbetween.

EMBODIMENT 4

Cloth of activated carbon of thickness 0.2 mm woven with activated carbon fibers of novolak kind is dipped into a colloidal carbon liquid (Aquadac made by Acheson & Co. of USA), and after being taken out, is dried at 100° C. for 10 min. On one side of activated carbon fiber cloth thus made, aluminum layer (thickness 20 μm) is formed by plasma spray method, and thereafter it is die-cut into circle shape to constitute electrode bodies. Between this circle-shaped electrode bodies, separator made of polypropylene is put and two sheets of the electrode bodies are laminated, and as electrolyte a mixed liquid of propylene carbonate, tetraethylammoniumperchlorate and γ-butyloractone is injected, and subsequently outside forming is made by a gasket and metal cases.

EMBODIMENT 5

Tin oxide layer (thickness 5 μm) is formed by vacuum deposition method on an activated carbon cloth of thickness 0.2 mm woven with activated carbon fibers of novolak kind. Furthermore, an aluminum layer (20 μm thickness) is formed thereon, and thereafter it is cut into circle shape of diameter 20 mm to constitute electrode body. By putting a separator made of polypropylene between the electrode bodies, two sheets of the electrode bodies are laminated, and as electrolyte a mixed liquid of propylene carbonate and tetraethylammoniumperchlorate is injected and outside forming is made with a gasket and metal cases.

EMBODIMENT 6

Figure 33:
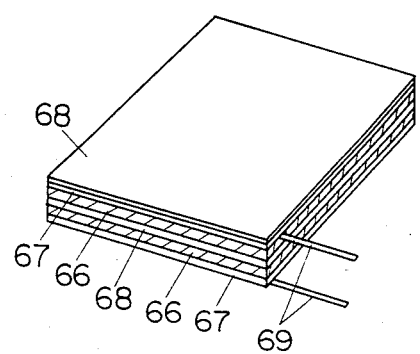
FIG. 33 is a perspective view of an essential part showing another embodiment of an electric double layer capacitor of the present invention.
Figure 34:
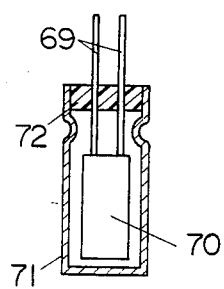
FIG. 34 is a sectional view showing the completed state of the same capacitor.

Activated carbon cloth of thickness 0.2 mm woven with activated carbon fibers of novolak kind is dipped in aqueous solution (0.5 mole/l) of ruthenium chloride for 5 min. Nextly, it is held in a thermal decomposition furnace of 300° C. for 10 min., to form ruthenium oxide layer on a surface of the activated carbon fiber. On one face of the matter thus made, an aluminum layer (thickness 20 μm) is formed by plasma spraying method, it is cut into squares of 3 cm×3 cm to produce electrode bodies. As shown in FIG. 33, these electrode bodies are laminated with separators made of polypropylene put inbetween, and thereafter wound to constitute a cylindrical capacitor body, and the capacitor body is enclosed in a cylindrical case of aluminium, and the opening part of the case is sealed with a rubber cap. In FIG. 33 and FIG. 34, 66 is electrode body, 67 is aluminum layer, 68 is separator, 69 is lead wire, 70 is capacitor body, 71 is case and 72 is rubber cap.

Several characteristics of the electric double layer capacitor of this invention obtained by the Embodiment 3–Embodiment 6 are shown in Table 4. Furthermore, characteristics of those of button type which is not provided with conductivity improving agent and those of wound up type capacitor are also shown.

TABLE 4

| | Capacitance | Internal resistance | High temperature load life 1.7 V, 70° C., 100 hr. (Capacitance change) |
|---|---|---|---|
| Products of the invention | | | |
| Embodiment 3 | 3.5 F | 0.05 Ω | −3% |
| Embodiment 4 | 3.5 F | 0.05 Ω | −3% |
| Embodiment 5 | 3.2 F | 0.1 Ω | −3% |
| Embodiment 6 | 5.2 F | 0.01 Ω | −3% |
| Comparison example | | | |
| Button type | 3.0 F | 0.2 Ω | −5% |
| Wound-up type | 4.5 F | 0.05 Ω | −5% |

EMBODIMENT 7

On one surface of activated carbon fiber cloth of diameter 2.0 cm (of Japan Kynol Inc.) specific surface area 2000 m²/gr) aluminum conductive layer of thickness 5 μm is formed by plasma spray method. In this activated carbon fiber cloth, a solution prepared by mixing 1,2-dimethoxyethane 30 wt%, γ-butyrolactone 50 wt% and tetrametylammoniumperchlorate 20 wt% is soaked. This two sheets of the activated carbon fiber cloths are laminated by putting a film of polypropylene of thickness 10 μm inbetween, and outside forming was made by outside case made of metal and a gasket made of rubber. Also a sample which is trially made by soaking electrolyte in two sheets of the activated carbon fiber in a reduced pressure atmosphere of 1 mmHg of room temperature retaining for 10 min. was made. A trial making with respect to a capacitor using as electrolyte constituted with propylene carbonate 30 wt%, γ-butyrolactone 50 wt% and tetramethylammoniumperchlorate 20 wt% was also made.

Table 5 shows result of this embodiment.

TABLE 5

|  |  | Capacitance | Internal resistance | High temperature load life (at 1.7 V, 70° C., 1000 hr.) (Capacitance change) |
|---|---|---|---|---|
| Product of the present invention | Normal pressure impregnation | 3 F | 0.15 Ω | −3% |
|  | Vacuum impregnation | 3.2 F | 0.14 Ω | −3% |
| Comparison example | — | 1.5 F | 0.5 Ω | −3% |

EMBODIMENT 8

On one surface of the activated carbon fiber cloth (of Nippon Kynol Inc., specific surface area 2000 m²/gr) an aluminum conductive layer of thickness 5 μm is formed by plasma spraying method. 10 sheets of what is made by cutting this in 10 mm square are laminated with separators as shown in FIG. 24 and FIG. 25. And, the separator used in this embodiment is of polypropylene film of thickness 10 μm, and in the separator and the activated carbon fiber cloth a solution prepared by mixing propylene carbonate 30 wt%, γ-butyrolactone 50 wt% and tetramethylammoniumperchlorate 20 wt% as electrolyte is soaked. On each other opposing end face of such laminated construction, aluminium layers (thickness 10 μm) are formed by plasma spraying method to carry out electrode taking out. Laminated type capacitor thus made is subject to outside forming in a method shown in FIG. 30, and measurement of charactreristic was done.

Table 6 shows comparing characteristics of electric double layer capacitor made in accordance with the present embodiment and conventional capacitor wound by using activated carbon powder in electrodes and a single layer capacitor using activated carbon fiber in electrode.

TABLE 6

|  | Capacitance | Internal resistance | High temperature load life (at 1.7 V, 70° C., 1000 hr. (Capacitance change) | Volume ratio |
|---|---|---|---|---|
| Polarizable electrodes opposing type (FIG. 23) | 8 F | 0.17 Ω | −3% | 1 |
| Polarizable electrode and non-polarizable electrode opposing type (FIG. 24) | 8 F | 0.17 Ω | −3% | 1 |
| Single layer flat sheet type | 2 F | 0.15 Ω | −3% | 0.5 |
| Conventional products | 8 F | 3 Ω | −20% | 10 |

EMBODIMENT 9

On one side of activated carbon fiber cloth of thickness 0.2 mm woven with activated carbon fibers of novolak kind, an aluminium foil of thickness 0.05 mm is bonded with conductive bond of epoxy carbon. Nextly electrode bodies are obtained by die-punching this into circle shape of diameter 20 mm. This circle-shaped electrode bodies are laminated by putting a separator made of polypropylene inbetween, and mixed liquid of propylene carbonate, γ-butyrolactone and tetraethylammoniumperchlorate as electrolyte is injected and outside forming is made with gasket and metal cases.

Characteristics of capacitor thus made is shown in Table 7.

TABLE 7

| Capacitance | Internal resistance | High temperature life test (at 1.7 V, 70° C., 1000 hr.) |
|---|---|---|
| 3.0 F | 0.2 Ω | −5% |

POSSIBLE UTILIZATION IN INDUSTRY

As has been explained above, in accordance with electric double layer capacitor of this invention, since polarizable electrodes are constituted with carbon fiber or activated carbon fiber and conductive electrodes are formed on the polarizable electrodes, accordingly such an effect is obtainable as mechanical strength of the electrode parts becomes high, and small type capacitors in various shapes are obtainable, and furthermore capacitance per unit volume can be made large and besides internal resistance and leak current can be made low.

What is claimed is:

1. An electric double layer capacitor having an electric double layer formed at an interface between a polarizable electrode and an electrolyte, wherein said polarizable electrode consists of carbon fibers or activated carbon fibers, a conductive electrode formed on one face of said polarizable electrode and an opposing electrode disposed on the other side of said polarizable electrode with said electrolyte inbetween.

2. An electric double layer capacitor of claim 1, wherein a polarizable electrode consisting of carbon fibers or activated carbon fibers, with a conductive electrode formed on one face thereof, is used as said opposing electrode.

3. An electric double layer capacitor of claim 1, wherein a non-polarizable electrode is used as said opposing electrode.

4. An electric double layer capacitor of claim 1, wherein an electric conductivity improving agent for increasing conductivity is carried on one or both faces of said polarizable electrode.

5. An electric double layer capacitor of claim 4, wherein said conductivity improving agent is selected from a conductive transition metal oxide, conductive paints and conductive oxides.

6. An electric double layer capacitor of claim 5, wherein said conductive transition metal oxide is selected from ruthenium, osmium, iridium, indium and platinum.

7. An electric double layer capacitor of claim 1, wherein micro-pores are provided in said carbon fibers or activated carbon fibers such that among the micro-pores, the total of the inside surface areas of the micro-pores having an inner diameter of 20 Å or larger occupies at least 1% of the total of the inside surface areas of all of the micro-pores.

8. An electric double layer capacitor of claim 1, wherein phenol-type carbon fibers are used.

9. An electric double layer capacitor of claim 1, wherein novolac-type activated carbon fibers are used made by carbonization and activating carbon fibers and phenol-type carbon fibers are used.

10. An electric double layer capacitor of claim 9, wherein carbonization and activation is made by using a metal salt or hydroxide of metal containing ions of lithium, sodium, potassium, magnesium, calcium or zinc as a catalyst.

11. An electric double layer capacitor of claim 1, wherein said polarizable electrode is in the form of a cloth, felt or sheet type material which consists of carbon fibers or activated carbon fibers.

12. An electric double layer capacitor of claim 1, wherein said conductive electrode is a metal layer formed by plasma spraying or arc spraying.

13. An electric double layer capacitor of claim 12, wherein said sprayed metal is selected from aluminum, nickel, copper, zinc, tin, lead, titanium and tantalum.

14. An electric double layer capacitor of claim 12, wherein weight of sprayed metal per unit area of said polarizable electrode surface is 0.05 mg/cm$^2$–500 mg/cm$^2$.

15. An electric double layer capacitor of claim 1, wherein said conductive electrode is made of a metal foil and it is bonded on said polarizable electrode with a conductive bond.

16. An electric double layer capacitor of claim 15, wherein the material of said metal foil is selected from aluminum, nickel, copper, zinc, tin, lead, titanium and tantalum.

17. An electric double layer capacitor of claim 1, wherein said conductive electrode is formed with a conductive paint.

18. An electric double layer capacitor of claim 1, wherein said electrolyte at least contains 1,2-dimethoxyethane.

19. An electric double layer capacitor of claim 1, wherein said element is enclosed in a pair of metal cases which form a pair with two pieces, and said conductive electrodes on said polarizable electrodes and said opposing electrodes are electrically contacted to said metal cases.

20. A multiunit capacitor element having an electric double layer formed at an interface between a polarizable electrode and an electrolyte, wherein said polarizable electrode consists of carbon fibers or activated carbon fibers with a conductive electrode formed on one face thereof, each unit capacitor element prepared by laminating said polarizable electrode such that margin parts are formed on both ends with a separator soaked with electrolyte inbetween, a plurality of said unit capacitor elements are laminated together and electrodes for outside leading out are formed on both ends of this laminated body.

21. A multiunit capacitor of claim 20, wherein each said unit capacitor element is constituted by disposing one polarizable electrode among polarizable electrodes opposite to said separator inbetween, in a manner that said conductive electrode on said polarizable electrode is situated on the side of said separator.

22. A multiunit capacitor of claim 20, wherein said outside leading out electrodes are constituted with metal layers made by plasma spraying or arc spraying.

* * * * *